(12) United States Patent
Limprecht et al.

(10) Patent No.: US 8,135,794 B2
(45) Date of Patent: Mar. 13, 2012

(54) AVAILABILITY AND SCALABILITY IN A MESSAGING SYSTEM IN A MANNER TRANSPARENT TO THE APPLICATION

(75) Inventors: Rodney T. Limprecht, Woodinville, WA (US); Richard D. Hill, Kirkland, WA (US); David E. Langworthy, Kirkland, WA (US); Hany Essam Ramadan, Redmond, WA (US); Shy Cohen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 94 days.

(21) Appl. No.: 12/751,627

(22) Filed: Mar. 31, 2010

(65) Prior Publication Data

US 2010/0192025 A1 Jul. 29, 2010

Related U.S. Application Data

(63) Continuation of application No. 10/402,052, filed on Mar. 27, 2003, now Pat. No. 7,693,952.

(51) Int. Cl.
*G06F 15/16* (2006.01)
(52) U.S. Cl. ...................................... 709/207
(58) Field of Classification Search ............ 709/207
See application file for complete search history.

(56) References Cited

U.S. PATENT DOCUMENTS

| | | | |
|---|---|---|---|
| 5,377,350 A | 12/1994 | Skinner | |
| 5,465,251 A | 11/1995 | Judd | |
| 5,786,771 A | 7/1998 | Feeney | |
| 5,819,272 A | 10/1998 | Benson | |
| 5,826,269 A | 10/1998 | Hussey | |
| 5,870,556 A | 2/1999 | Cote | |
| 5,872,930 A | 2/1999 | Masters | |
| 6,205,498 B1 | 3/2001 | Habusha | |
| 6,230,156 B1 | 5/2001 | Hussey | |
| 6,256,634 B1 | 7/2001 | Moshaiov | |
| 6,339,794 B2 | 1/2002 | Bolosky | |

(Continued)

FOREIGN PATENT DOCUMENTS

WO WO 00/41365 7/2000

(Continued)

OTHER PUBLICATIONS

Brown, A., Reliable Messaging, Prepared for the W3C Workshop on Web Services, Apr. 11-12, 2001, San Jose, CA, USA. pp. 1-2.*

(Continued)

*Primary Examiner* — Wing Chan
*Assistant Examiner* — Alicia Baturay
(74) *Attorney, Agent, or Firm* — Workman Nydegger

(57) ABSTRACT

Methods, systems, and computer program products that provide for a runtime messaging infrastructure, which abstracts send and receive operations for exchanging messages with partner endpoint. The messaging infrastructure improves availability and scalability of a message application by improving on the availability and scalability of the underlying message transports. In particular, availability and scalability are improved by linking the message application at runtime with any number of the message transports, without the message application specifying a transport at development time. The message infrastructure receives instructions from the message application specifying end-to-end delivery assurances. The infrastructure uses transports in order to fulfill the specified delivery assurance, and creates a link between the message application and transports for use in exchanging messages. Session state storage can be maintained in a pluggable store, which could be, for example, a durable database store or an application memory store.

22 Claims, 4 Drawing Sheets

U.S. PATENT DOCUMENTS

| | | | | |
|---|---|---|---|---|
| 6,356,633 | B1* | 3/2002 | Armstrong | 379/265.11 |
| 6,442,546 | B1* | 8/2002 | Biliris et al. | 1/1 |
| 6,446,144 | B1 | 9/2002 | Habusha | |
| 6,446,206 | B1 | 9/2002 | Feldbaum | |
| 6,466,987 | B2 | 10/2002 | Bolosky | |
| 6,522,635 | B1* | 2/2003 | Bedwell | 370/314 |
| 6,594,701 | B1* | 7/2003 | Forin | 709/232 |
| 6,889,244 | B1* | 5/2005 | Gaither et al. | 709/202 |
| 7,039,050 | B1* | 5/2006 | Mutreja | 370/389 |
| 7,050,432 | B1* | 5/2006 | Banavar et al. | 370/390 |
| 7,072,807 | B2* | 7/2006 | Brown et al. | 703/1 |
| 7,080,385 | B1* | 7/2006 | Collison et al. | 719/318 |
| 7,089,317 | B2* | 8/2006 | Jeyaraman et al. | 709/230 |
| 7,185,209 | B2* | 2/2007 | Langworthy et al. | 713/193 |
| 7,188,155 | B2* | 3/2007 | Flurry et al. | 709/219 |
| 7,240,349 | B2* | 7/2007 | Hickson et al. | 719/314 |
| 7,254,616 | B1* | 8/2007 | Ennis et al. | 709/213 |
| 7,584,422 | B2* | 9/2009 | Ben-Yehuda et al. | 715/236 |
| 7,676,279 | B2* | 3/2010 | Hood et al. | 700/17 |
| 7,676,580 | B2* | 3/2010 | Hill et al. | |
| 7,693,952 | B2* | 4/2010 | Limprecht et al. | |
| 2002/0023131 | A1 | 2/2002 | Wu | |
| 2002/0091533 | A1* | 7/2002 | Ims et al. | |
| 2002/0177453 | A1 | 11/2002 | Chen | |
| 2002/0178227 | A1* | 11/2002 | Matsa et al. | |
| 2002/0178231 | A1* | 11/2002 | Matsa et al. | |
| 2003/0093479 | A1 | 5/2003 | Mellen-Garnett et al. | |
| 2003/0110314 | A1* | 6/2003 | Barnes | 709/328 |
| 2003/0158961 | A1* | 8/2003 | Nomura et al. | |
| 2004/0001476 | A1* | 1/2004 | Islam et al. | |
| 2004/0010553 | A1* | 1/2004 | Katz et al. | 709/206 |
| 2004/0054942 | A1* | 3/2004 | Shoaib et al. | |
| 2004/0111652 | A1* | 6/2004 | Shoaib et al. | |
| 2004/0117425 | A1* | 6/2004 | Berkland et al. | |
| 2004/0205124 | A1* | 10/2004 | Limprecht et al. | |
| 2004/0205781 | A1* | 10/2004 | Hill et al. | |
| 2005/0226240 | A1* | 10/2005 | Hoffmann et al. | 370/389 |
| 2005/0289524 | A1* | 12/2005 | McGinnes | 717/140 |
| 2006/0168132 | A1* | 7/2006 | Bunter et al. | 709/219 |
| 2006/0235733 | A1* | 10/2006 | Marks | 705/7 |
| 2006/0248143 | A1* | 11/2006 | Collison et al. | 709/204 |
| 2009/0133038 | A1* | 5/2009 | Chkodrov et al. | 719/314 |

FOREIGN PATENT DOCUMENTS

| | | |
|---|---|---|
| WO | WO 01/67622 | 9/2001 |
| WO | WO 01/93503 | 12/2001 |

OTHER PUBLICATIONS

Lazar, Sashi; Weerakoon, Ishan; and Sidhu, Deepinder; "A Scalable Location Tracking and Message Delivery Scheme for Mobile Agents," Proceedings Seventh IEEE International Workshops on Enabling Technologies: Infrastructure for Collaborative Enterprises (WET ICE '98), Jun. 17-19, 1998, pp. 243-248.

Brzezinski, Jerzy; Kobusinska, Anna; and Kobusinski, Jacek; "Reliable Services for Distributed Environment," Proceedings International Conference on Parallel and Distributed Processing Techniques and Applications, Jun. 26-29, 2000, vol. V, pp. 2667-2673.

Horrell, Simon; "Microsoft Message Queue (MSMQ)," *Enterprise Middleware*, Jun. 1999, pp. 25-35.

Al-Jaber, Hessa and Rotenstreich, Shmuel; "The Cascade Fault Tolerance Message System," Seventeenth Annual ACM Computer Science Conference, Feb. 21-23, 1989, pp. 252-259.

Kausar, Nadia and Crowcroft, Jon; "End to End Reliable Multicast Transport Protocol Requirements for Collaborative Multimedia Systems," Proceedings Seventeenth IEEE Symposium on Reliable Distributed Systems, Oct. 20-23, 1998, pp. 425-430.

Kung, Roberto and Shacham, Nachum; "A Distributed Algorithm for Reliable Message Delivery over a Sub-Network," GLOBECOM'87 IEEE/IEICE Global Telecommunications Conference 1987, Nov. 15-18, 1987, vol. 1, pp. 193-198.

Tai, Stephen; Mikalsen, Thomas; Rouvellou, Isabelle; Sutton, Stanley M. Jr.; "Conditional Messaging: Extending Reliable Messaging with Application Conditions," Proceedings 22nd International Conference on Distributed Computing Systems, Jul. 2-5, 2002, pp. 123-132.

Al-Jaber, Hessa and Rotenstreich, Shmuel, "Reliable Message Delivery without Hard Backups," *International Journal of Mini and Microcomputers*, 1992, vol. 14, No. 3, pp. 117-124.

Jim Gray & Andreas Reuter, *Transaction Processing: Concepts and Techniques* (Bruce M. Spatz ed., Morgan Kaufmann Publishers, Inc. 1993).

Bilorusets, Ruslan, et al. *Web-Services Reliable Messaging Protocol (WS-Reliable Messaging)*, BEA, IBM, Microsoft and TIBCO, Mar. 13, 2003.

IBM, et al. *Reliable Message Delivery in a Web Services World: A Proposed Architecture and Roadmap*, A Joint White Paper from IBM Corporation and Microsoft Corporation, Mar. 13, 2003.

Mukhi, N., Khalaf, R., Fremantle, P., *Multi-Protocol Web Services for Enterprises and the Grid*, Euroweb 2002, Dec. 17, 2002.

Lin, J. et al., RMTP: A Reliable Multicast Transport Protocol, Mar. 24-28, 1996, Proceedings of IEEE INFOCOM '96, vol. 3, pp. 1414-1424.

Paul, S. et al., Reliable Multicast Transport Protocol (RMTP), Apr. 1997, IEEE Journal on Selected Areas in Communications, vol. 15, Issue 3, pp. 407-421.

Brown, Allen, Reliable Messaging, Prepared for the W3C Workshop on Web Services. Apr. 11-12, 2001. San Jose, CA, USA.

U.S. Appl. No. 10/402,052, Oct. 13, 2006, Office Action.
U.S. Appl. No. 10/402,052, Mar. 20, 2007, Office Action.
U.S. Appl. No. 10/402,052, Sep. 11, 2007, Office Action.
U.S. Appl. No. 10/402,052, Feb. 21, 2008, Office Action.
U.S. Appl. No. 10/402,052, Aug. 21, 2008, Office Action.
U.S. Appl. No. 10/402,052, Apr. 28, 2009, Office Action.
U.S. Appl. No. 10/402,052, Dec. 31, 2009, Notice of Allowance.

* cited by examiner

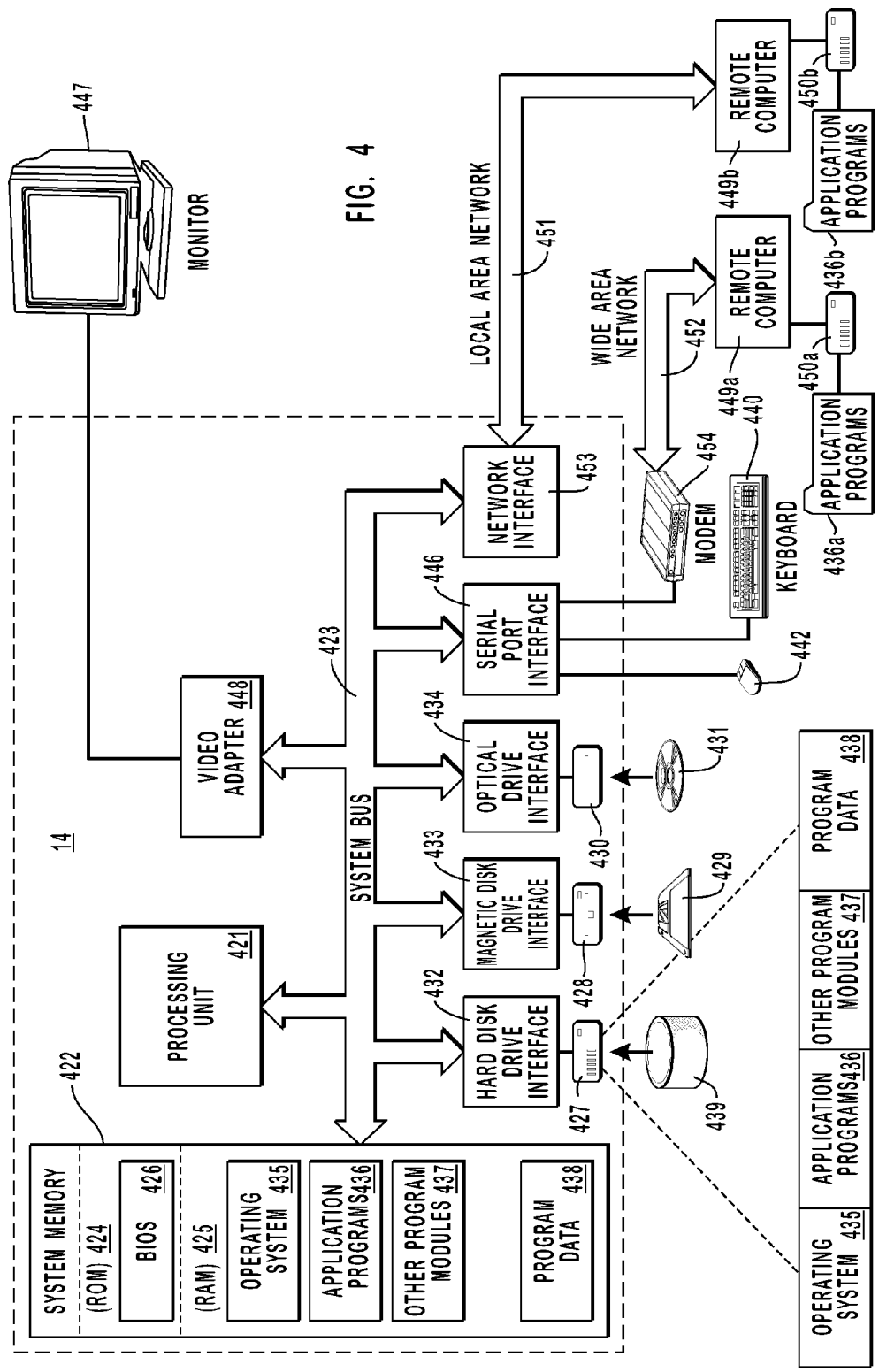

AVAILABILITY AND SCALABILITY IN A MESSAGING SYSTEM IN A MANNER TRANSPARENT TO THE APPLICATION

CROSS-REFERENCE TO RELATED APPLICATIONS

This application is a continuation of, and claims priority to and the benefit of, U.S. patent application Ser. No. 10/402,052 filed on Mar. 27, 2003 and entitled "AVAILABILITY AND SCALABILITY IN A MESSAGING SYSTEM IN A MANNER TRANSPARENT TO THE APPLICATION", which application is expressly incorporated herein by this reference, in its entirety.

BACKGROUND OF THE INVENTION

1. The Field of the Invention

The present invention generally relates to reliable messaging systems. More particularly, the present invention provides systems, methods, and computer program products for improving availability and scalability for reliable two-party messaging systems, such that the improvements are transparent to the application.

2. Background and Relevant Art

Messaging systems have become an increasingly popular way to communicate. These communication systems range from e-mail systems to secured transactions, from chat rooms to various web services such as internet shopping. These systems and applications have widely-varying requirements regarding messaging reliability, security, performance, availability and scalability. Existing systems offer partial solutions that address specific, limited combinations of the more general requirements.

Traditional prior art messaging systems typically offer limited flexibility in terms of the assurances (e.g., exactly-once delivery), message exchange patterns (e.g., one-way versus request/response or full duplex), and messaging interface semantics (e.g., transactional message buffering). Each of these messaging systems typically address a limited set of scalability and availability requirements, and either offer few options for extending the system to increase overall scalability or availability, or require extensive application involvement.

For example, consider the following two-party communication models. Datagram systems typically offer one-way, session-less message exchange, with fire and forget reliability, and offer little direct support for scalability and availability. These systems offer developers the ultimate freedom and flexibility to build everything themselves.

TCP provides full-duplex, session-oriented communication. It has a richer, but fixed set of delivery assurances (exactly-once, in-order, delivery of bytes). Connection state is maintained in volatile in-memory data structures, and connections cannot survive system and process failures, and many network failures, limiting availability.

RCP provides a half-duplex exchange pattern; some systems limit this to single request/response interactions and some provide for conversational sessions. In either case, endpoint state is typically maintained in-memory and hence has availability limitations similar to TCP. While the session-less request/response systems can sometimes achieve great scalability (consider HTTP-based web farms), these typically do not provide at-most-once request processing, hence limiting their use to idempotent requests. Session based RPC systems can provide request retry with at-most-once processing allowing for some increased availability. In some cases, the underlying transport connections are managed by the runtime allowing multiplexing with some increase in scalability.

Finally, message queuing systems generally provide exactly-once delivery semantics. Unlike the datagram, TCP and RPC models, queues impose buffering between the two communicating parties, allowing for additional connectivity and scheduling flexibility. Many message queuing systems provide durable state storage affording additional availability by tolerating process and system failures. Some queuing systems also have transaction support; this model can increase reliability and availability by automatically undoing partial work and enabling automatic retry processing. These systems generally impose limited storage options, such as requiring the use of a proprietary, durable store, and have transport dependencies that limit network configuration.

Accordingly, there exists a need for a messaging system that allows increased flexibility to adapt applications to special runtime conditions and requirements, as long as the application-mandated assurances are met. Further, there exists a need for a messaging system with the aforementioned flexibility that can be used to tailor application availability and scalability to the needs of a specific deployment, in a manner transparent to the application program.

BRIEF SUMMARY OF THE INVENTION

In accordance with example embodiments of the present invention, the above-identified deficiencies and drawbacks of current messaging systems are overcome. For example, exemplary embodiments provide for a runtime messaging infrastructure that abstracts send and receive operations for exchanging messages with a partner endpoint over a number of message transports. The present invention improves availability and scalability of a message application by improving the availability and scalability of the underlying message transport. For example, availability is improved by masking many errors, providing support for durable state maintenance, support for clusters, redundancy of service, configurable timeouts, and configurable buffer sizes, all invisible to the application. Scalability is achieved by configurable buffer sizes and replication of services, e.g., service farms.

In particular, availability and scalability are improved by selecting one of the message transports to link with the message application at runtime. A message infrastructure in accordance with the present invention receives instructions from the message application specifying end-to-end message delivery assurances, such as at least once message delivery, at most once message delivery, in order sent message delivery, and session time to live. The selected assurances are used in selecting a suitable message transport at runtime, without the message application specifying the suitable transport at development time. The infrastructure selects at least one transport that meets the end-to-end message delivery assurances and creates a link between the message application and the selected transport for use in exchanging messages between the message application and the partner endpoint.

In accordance with other example embodiments of the present invention, the infrastructure can receive instructions from the message application specifying local reliable message features, such as a session state storage, a message time to live, and a transacted messaging buffering. The local reliable messaging feature of a session state storage can be maintained in a pluggable store, which could be, for example, a daemon process store, a durable database store or an application memory store. The selection of the store defines the durability of the session state, providing the ability to recover from more kinds of failures (e.g., application crashes, node crashes, etc.), which in turn provides increased availability. Similarly, a disk-based store may be able to hold more messages than a memory based store, thus improving both scalability and availability.

Among other things, the local reliable messaging features also may include the following: a buffer quota, which defines the maximum number of messages that will be buffered by the messaging infrastructure; a send timeout, which unblocks the send operation after the send timeout expires; a priority option, wherein higher priority messages are transmitted before lower priority messages; and a configurable poison message feature, wherein the number of times a message delivery is aborted is configurable to determine when the message is poison.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an example system that provides a suitable operating environment for the present invention.

DETAILED DESCRIPTION OF THE PREFERRED EMBODIMENTS

The present invention extends to methods, systems, and computer program products for simplifying reliable messaging application development by providing a single programming model for accessing and using a plurality of distinct message transports while developing one or more applications. The embodiments of the present invention may comprise a special purpose or general-purpose computer including various computer hardware, as discussed in greater detail below.

Figure 1:
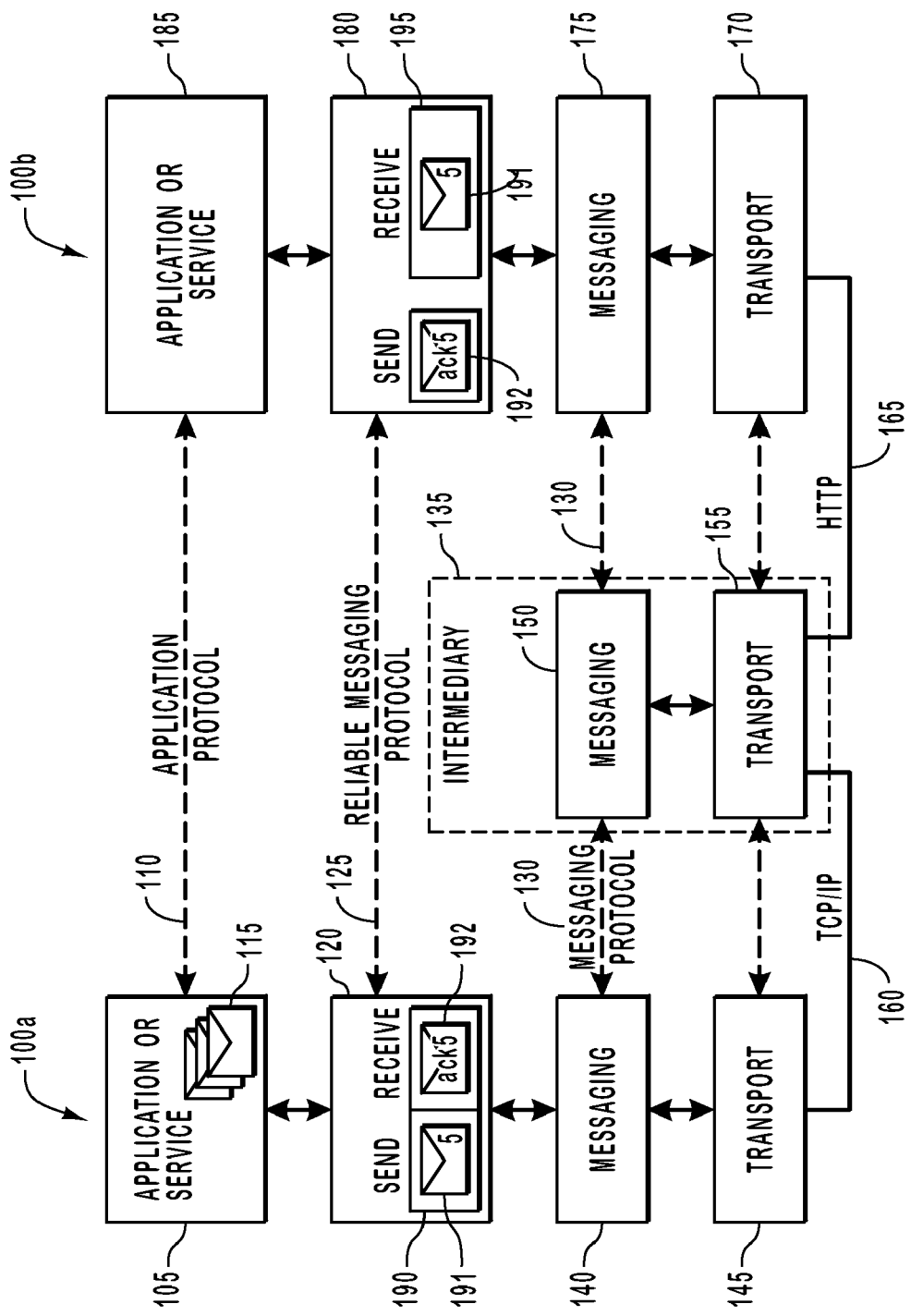
FIG. 1 illustrates a reliable messaging stack in accordance with example embodiments of the present invention.

FIG. 1 illustrates a high-level representation of reliable messaging stacks 100a and 100b. In a messaging stack, without a Reliable Messaging Protocol 125 the Application 105, when desiring to send a message to, e.g., another Application layer 185, would transfer a message or a series of messages 115, directly to the datagram Messaging layer 140. (Note that Application 105 may be any type of application, such as, for example, a service, and generally should be understood to encompass an application framework as appropriate.) Because datagrams are not reliable, the messages or message 115 could be duplicated, delayed and/or dropped. For example, in a less reliable Datagram protocol having fire and forget reliability, message or messages 115 might be dropped for any number of reasons, including at intermediary 135 between transports 160 and 165. Accordingly, the partner endpoint Application 185 would never receive the message or messages 115 and the sending Application 105 would be unaware that message or messages 115 were not received.

In accordance with example embodiments of the present invention, however, reliable messaging stacks 100a and 100b are provided with a Reliable Messaging Protocol 125. Accordingly, for example, the Reliable Messaging Framework 120 (or alternatively 180) can insure that the message or messages 115 sent from Application 105 properly arrive at their destination endpoint. For example, if Application 105 desires to transfer message or messages 115 to its session counterpart Application 185, Application 105 can Send( ) message or messages 115 to the Reliable Messaging Framework 120 where they are assigned to the session and given message sequence numbers. A session identifier corresponds to the session communication between Application 105 and Application 185. In other words, a session refers to the duplex conversation between the two Applications 105 and 185. The sequence numbering corresponds to the particular message within the session communication. For example, there may be several messages within a single session communicated between the two Applications 105 and 185, and each message is numbered sequentially in the order sent by the application. In addition, there may be multiple sessions established between Applications 105, 185 and possibly other applications (each session established may have the same or different delivery assurances). Accordingly, each message would be assigned a session and sequence number uniquely identifying the particular session and sequence ordering of the messages within the session.

After writing a session and sequence header on the message 191 and performing other required channel processing, message 191 is stored in Session State 190 in a send buffer. Subsequently, a copy of message 191 is transported down through the datagram Messaging 140, which facilitates end-to-end transmission of message 191 by, e.g., providing routing headers. Message 191 is then transferred, potentially through one or more intermediaries, e.g., Intermediary 135, each facilitating end-to-end transmission of message 191 as a series of point-to-point transmissions. The extensible interception mechanism may be used to implement behaviors such as routing, filtering, policy management and security. It is noted that the transports 145, 170, 155 and behaviors available at end points in messaging endpoints and intermediary 140, 175, 150 can be established either programmatically or through configuration.

If the assurance for At-Least Once delivery (described in greater detail below) is specified for Application 105, Reliable Messaging Framework 120 expects to receive acknowledgements from Reliable Messaging Framework 180 indicating which messages are properly received. Message 192 carries an acknowledgement that message 191 (e.g., message 5 in a sequence) was received. Periodically, if an acknowledgment message 192 is not received by Reliable Messaging Framework 120, either because a copy has not been properly received by Reliable Messaging Framework 180, or because none of the acknowledgements from 180 were received by 120, message 191 is transmitted again. Accordingly, if message 191 was dropped, delayed, or misrouted, for example, by Intermediary 135, Reliable Messaging Framework 120 continues (within a timeout period, later described) to periodically transmit message 191 in an attempt to assure that at least one copy of message 191 is properly received by Reliable Messaging Framework 180. It should be noted, however, that for similar reasons as those described above with regard to message 191, acknowledgment 192 can be dropped, delayed or misrouted. As such, the present invention provides for reliable message delivery of acknowledgment message 192 as described hereinafter.

Once the Reliable Messaging Framework 180 successfully receives a copy of message 191, it sends acknowledgment message 192 to Reliable Messaging Framework 120. Upon receipt of acknowledgment message 192, Reliable Messaging Framework 120 deletes from its Session State (send) buffer 190 the copy of message 191 and stops doing additional transmissions of it. Similarly, Reliable Messaging Framework 180 records in its Session State 195 that it has received a copy of message 191, so that any duplicate messages received by Reliable Message Framework 180 can be discarded, independent of whether or not the messages have already been delivered to the application 185. Thereafter, Application 185 can retrieve from the Session State (receive) buffer 195 the received message though its Receive( ) command. If Reliable Messaging Framework 120 does not receive acknowledgment 192 because it was dropped, delayed, or misrouted, then retransmission of message 191 will continue, thereby triggering Reliable Messaging Framework 180 to send another copy of acknowledgement 192. This process may continue until at least one acknowledgment 192 is received by Reliable Messaging Framework 120 or until Reliable Messaging Framework 120 gives up retrying and sends a fault indication to application 105.

Figure 2:
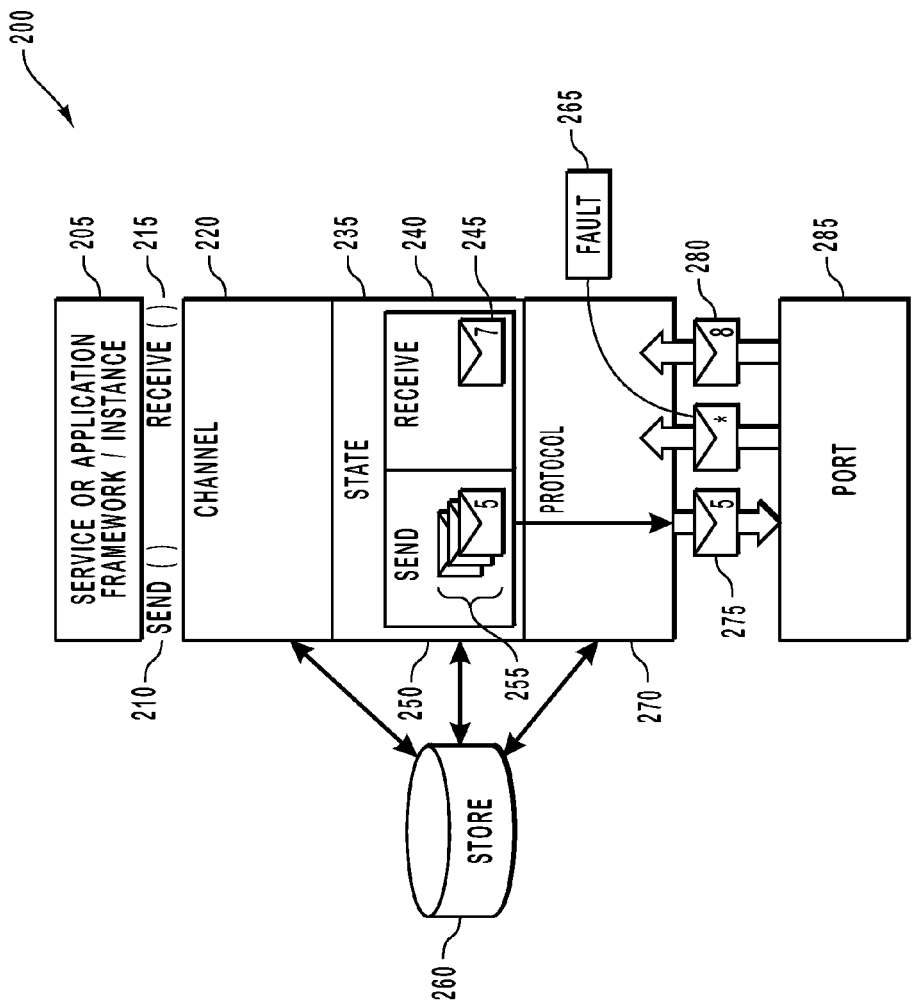
FIG. 2 illustrates a message framework in accordance with example embodiments of the present invention.

Reliable Messaging Frameworks 120 and/or 180, can each be configured as Dialog 200 (FIG. 2) in accordance with the present invention and as described in greater detail with regard to FIG. 2. Dialog 200 is a message framework abstraction, wherein services (or application instances) use Dialog 200 for reliable session-oriented communication with other services. Programmers can use a Dialog Channel 220 to access Dialogs. Moreover, Dialog 200 provides a reliable messaging infrastructure and a single programming model where the message delivery assurances to the applications are configurable. These reliability assurances need to be met or a session failure occurs. The design of Dialog 200 gives a corresponding runtime implementation the flexibility to offer additional features subject to maintaining the assurances (correctness constraints) asserted for the application implementation. In particular, an application can be provided with varying degrees of availability and scalability transparent to the application implementation. Further, these session communications between Applications 105 and 185 may be realized over a variety of transport types (e.g., TCP/IP 160 and HTTP 165), transport connection instances, and network topologies.

The reliability assurances provided by Dialog 200 include At-Least Once (ALO), At-Most Once (AMO) and In-Order (10) delivery. An additional Session Time-To-Live (TTL) assurance is also provided. The AMO assurance guarantees that for any given message sent by the sending application, the message will be delivered to the receiving application at most one time. Because Dialog 200 is an abstraction, the application is relieved from having to detect and discard duplicate messages if duplicate messages would break the application semantics. Similarly, the ALO assurance provides that all the messages sent by the sending application are received by the receiving endpoint, which relieves the applications from having to detect lost or misdirected messages and coordinate their retransmission. The 10 assurance provides that messages are delivered to the receiving application in the order they were sent by the sending application. This relieves the application from having to deal with out-of-order receipt of messages.

Dialog 200 also provides a session TTL assurance, which requires that the dialog session between the partner endpoint partners be completed before the session TTL expires. If the session TTL expires before the dialog session has been completed, the dialog channels are placed in a faulted state and notification of the fault is provided to the applications. The applications can extend the session TTL by renegotiating the TTL.

Dialogs allow these message delivery assurances to be used either individually or in any combination to meet the particular requirements of a given application and deployment. For example, the combination of the three AMO, ALO and IO assurances provides the exactly-once, in-order delivery typical of most reliable communication mechanisms, such as TCP/IP. Unlike typical communication mechanisms and their corresponding programming models, however, these assurances can be customized without changing the programming model that the application uses.

Dialog 200 not only allows for configurable assurances, but also allows for local reliable messaging features to be chosen and configured independently of each other, and independently of the assurances chosen above. These local reliable messaging features fall into two distinct categories: those that are integral to the programming model and those concerned with customization independent from the application program. For example, integral local features may include: transacted buffering, which has consistency, isolation and atomicity semantics for the application; or a profile reference, which associates a profile with a session to allow independent customization. Customizable local features might include: session state storage configuration, buffer quota, send timeout, configurable message TTL, session priority messages, or poison message detection threshold, as described hereinafter.

In accordance with example embodiments of the present invention, Dialog 200 provides session state and message storage as a replaceable component called the Dialog Store 260. Because the Dialog Store 260 is replaceable, third parties can independently author and distribute Dialog Store 260 implementations. Administrators can pick and choose the Dialog Stores actually used in a given installation. Accordingly, this mechanism allows tremendous flexibility to meet durability, performance, autonomy, and administrative goals. The Dialog Store 260 can be a pluggable store that has at least one of an in-memory storage, on-disk durable storage, in a daemon process storage, in non-volatile memory store, on optical storage, magnetic tape, network attached storage, or removable. Further, the Dialog Store can be remote or off-node.

In accordance with an example embodiment of the present invention, an in-memory Dialog Store implementation (e.g., Dialog Store 260) is provided which keeps all state in the application memory. This store provides very fast access to the state; however, at the cost of all state being lost if the application process state is lost (e.g. the application is terminated by the user, it is terminated by the operating system, e.g., due to an application fault, or the system where the application executes fails).

In accordance with another example embodiment, an express Dialog Store implementation (e.g., Dialog Store 260) keeps state in the memory of a separate dedicated daemon process. This Dialog Store insures that the state survives application process failure, however, at the cost of doing process switches to maintain the state. If the daemon process fails or the operating system or computer node fails, then all state for the sessions that it is responsible for are lost.

In accordance with yet another embodiment of the Dialog Store implementation (e.g., Dialog Store 260), session state information is maintained in a durable fashion in a database, such as Structured Query Language (SQL) server. This durable state can survive computer node or operating system failure, however, at the cost of doing disk writes to maintain state. One benefit of using a database system such as an SQL server for state maintenance is that installations may already have tools, techniques and processes in place for doing regular back-up and recovery of important application state.

The present invention also provides that some Dialog Stores can be configured to run on the local computer node, or another node. For example, a durable Dialog Store, such as an SQL server, may be configured to use a local server database or one on another node. The other node may be part of a clustered system, and thus have very high availability.

The present invention also provides that multiple stores (or store configurations) can exist simultaneously to meet the specific deployment characteristics used by an application or applications. Further, an application configuration can be modified to use a different store (or store configuration) in order to accommodate changes such as increased load or capacity requirements, to take advantage of new storage options or to address other deployment environment considerations. Furthermore, different communication sessions within the same application may have different configuration requirements. Dialog allows each session to be configured individually. For example, some sessions within an application may work best with durable state storage, whereas other sessions may work best with volatile state storage. Dialog store can be configured via a profile (described below) or specified in application code.

Another configurable feature offered by Dialog 200 is a buffer quota. Dialog 200 buffers messages at the sender and receiver applications. This buffering increases the autonomy of the two applications, allowing either side to send or receive messages to or from their local buffers, even if the other party is not running or is unreachable, e.g., due to a network partition. For example, Application 205 may continue to send messages even though the other party is temporarily unavailable, i.e., not running or unreachable. This is accomplished by accumulating messages in the local Send Buffer 250 until they can be successfully transferred. Similarly, Application 205 can receive messages that were previously buffered in Receive Buffer 245, even though the application that sent them currently may not be running. Dialog 200 provides a configurable buffer quota, which defines the maximum number of messages (contingent on the message size) that will be buffered by the system. Accordingly, this limits the amount of space consumed by the Dialog State 235, and limits the local resources that can be consumed by the other endpoint. This also allows the messaging system to reserve space sufficient for the application to locally buffer the specified number of messages. Dialog 200 also provides for a minimum buffer quota that defines a minimum reserved number of messages that will be buffered by the messaging infrastructure, which in combination with a maximum message size defines a minimum number of bytes that will be buffered by the messaging infrastructure. Buffer quota can be configured via a profile (described below) or specified in application code.

Dialog 200 also provides a configurable send timeout feature. When a message is sent, it is placed in the Dialog store 260/send buffer 250. If the buffer is full, i.e., if the buffer quota has been reached, then the call to Send( ) 210 is blocked until either the send timeout expires, or space becomes available in the buffer to hold the message. Space is made available in the buffer when messages are successfully transferred to, and acknowledged by, the receive endpoint and are no longer needed at the local endpoint for retry. If space becomes available before the send timeout expires, the Send( ) 210 calls complete normally. If the send timeout expires before space is available, an exception is raised providing notification to the application that the message could not be successfully buffered (captured). Accordingly, the application can try again later. The configurable timeout allows applications to choose the degree of responsiveness over the simplicity of blocking. Send timeout can be configured via a profile (described below) or specified in application code.

As mentioned previously, Dialog 200 supports a end-to-end session TTL assurance. Dialog 200 also provides an optional message Time-To-Live that is configurable as a local feature. The message TTL requires that transmitted messages must be successfully received by the receiving endpoint within a time specified in the TTL, otherwise an error is raised to the Application 205. Dialog 200 also provides a configurable extension for the message TTL. Accordingly, when the TTL expires, notification is provided to the sending Application 205. Application 205 then has the choice of terminating the dialog or extending the message's TTL. Similar to send timeouts, TTL's can be set by application code, or configured indirectly using a profile.

Another feature provided by Dialog 200 is the assigned optional priority. All messages within a Dialog 200 have the same priority. However, when messages from multiple Dialogs are available for transmission, Dialogs with higher priority are given precedence over Dialogs with lower priority in transmitting the messages. Similarly, when messages are available for "delivery" to the receiving application, messages with higher priority are received prior to messages with lower priority. Priorities can be set by application code or indirectly using profiles described hereinafter.

Dialog 200 also provides optional transacted buffering of messages. When a Dialog is used with transactions, the local send and receive buffers act as transactional resource managers. In this case, messages received under a transaction are considered tentatively delivered (deleted from the receive buffer) subject to transaction outcome. Similarly, messages sent under a transaction are tentatively captured (added to the send buffer) subject to transaction outcome. If the transaction commits, these tentative message captures and deliveries are made permanent. If the transaction aborts, these tentative operations are abandoned as if they never occurred. Like other transactional resource managers, the dialog stores are responsible for providing transactional isolation for tentative buffer operations (e.g., captured messages are not visible outside the transaction), and transactional atomicity with transaction completion under the control of a transaction manager.

Transactional buffering simplifies the development of correct messaging applications (e.g., that make correct state transitions even in the face of failures or concurrent activity). Applications can use this feature to coordinate message exchange and local message processing. For example, an application might receive and process a message within the scope of a transaction. This message processing might include reading and updating one or more transactional databases as well as sending one or more messages on dialogs included in the transaction. If the transaction aborts, all of the work is undone. In particular, the messages that were tentatively sent are abandoned—i.e., session partners won't see these partial results—and the received message remains available for delivery. The latter allows the message to be processed within the scope of a new transaction. When a transaction commits, all of this activity becomes permanent, including the deletion of the received message and the buffering of sent messages. The net affect is exactly-once message processing. Transactional buffering is a local Dialog feature in that whether or not the application uses this feature is completely transparent to its session partner applications.

In accordance with example embodiments, and as described below with reference to FIG. 2, at the sender endpoint when Send( ) 210 is called, the message is tentatively placed in the Dialog Store 260. If the transaction commits, the message is committed to the Store 260 and made available for transmission to the partner endpoint. If the transaction aborts, the message is discarded. At the receiver, when Receive( ) 215 (or Delete) is called, the message is tentatively deleted from the Dialog Store 260. If the transaction commits, the message is permanently deleted from the Store 260. If the transaction aborts, the message remains in the Store 260 and is available for re-delivery. Transacted receive allows for exactly-once processing of messages.

It should be noted that although transacted buffering is a common feature of queuing systems, these systems generally require a durable store. Dialog 200 provides these same transaction semantics regardless of durability of the Dialog Store 260, providing the same program model in all cases. For example, the in-memory store provides transactional semantics by participating as a transactional resource manager. Dialog 200, however, allows the application implementation to be isolated from deployment details, including the details associated with transport and connectivity characteristics, message routing and endpoint state management.

Another feature provided by Dialog 200 is an optional poison message function. As previously mentioned, when a message is received and processed under a transaction, and that transaction aborts, the message remains in the Dialog Store 260 and is available for re-delivery to the application. Sometimes the problem that causes the transaction to abort is transient, e.g., timeout due to deadlock, and delivery and message processing succeeds on the next attempt. If delivery attempts for a given message repeatedly cause an abort, the message is considered "poison". Dialog 200 provides a way to configure how many times message delivery aborts before the message is considered poison. When a poison message is detected, an error is raised to the application and further attempts at processing the message are halted until the application takes corrective action. This ensures that processing resources are not wasted attempting work that may never succeed, or may succeed only after some intervention. Poison message detection can be configured via a profile (described below) or specified in application code.

The optional profiles feature provides a named set of Dialog configuration options. As described above, there are many configurable features of Dialogs, such as buffer quotas, timeouts, stores, etc. Further, Dialog 200 provides for configurable message delivery assurances, e.g., ALO, AMO and IO, which application codes can independently specify a minimum level of desirable delivery assurance that can be increased through configuration if desired. Profile provides a way to group common Dialog settings, and to refer to those settings by name. Further, Dialog 200 implementation allows the selection of profiles through application configuration files so that administrators have deployment-time control over settings. When creating or accepting Dialogs, applications refer to the profile by name, and all the settings as specified in the profile are used to create the Dialog 200. Setting may be established directly as part of an application program, as code, or as other programming constructs. Profiles may be associated with a program indirectly by references in code or other programming constructs, such that profile values can be set independent of the application programs. Profile values established directly take precedence over profile value set indirectly by profile references.

Because Dialog 200 provides for any combination of these features and assurances, independent of one another, Dialog 200 can be configured to meet any coupling configuration from tightly-coupled programming models similar to that of Transmission Control Protocol (TCP) and Remote Procedure Call (RPC), to loosely-coupled programming models similar to datagrams and queues. In addition, Dialog 200 efficiently supports the various two-party message exchange patterns (MEPs) such as one-way, half-duplex (from a single request/response to more complex patterns), and the most complex full-duplex interactions. Accordingly, Dialog 200 allows for the unification of two-party communication programming models.

FIG. 2 illustrates the operational features of a Dialog 200 in accordance with example embodiments of the present invention. A Dialog Channel Application Programming Interface (API) 220 is provided as an abstraction for the Application 205. As previously described, Dialog 200 uses a messaging protocol, such as Web Services Reliable Messaging (WS-RM), which defines a sequence of messages. A sequence defines a unidirectional set of messages in a session. Two such sequences are combined to form a dialog, one sequence in each direction between the two communicating parties. When the Channel 220 method Send( ) 210 is called, the message, which is passed as a parameter to the Send method 210, is stored in Send State 250 and uniquely stamped with a monotonically increasing message sequence number according to the order in which the message was sent.

Messages 255 are buffered in Send State 250 to maintain state about the individual messages 255 in a sequence. At this point, the messages are said to be "captured" in State 250 and Send( ) 210 returns to the application. More particularly, the Send method 210 accepts one message as a parameter. It is this message that is passed to the Send buffer 250 to be stamped with a sequence number and subsequently or simultaneously stored in Store 260. It is at this point that the message is deemed "captured", and the Send method 210 returns. Repeating this call with other messages results in a sequence or partial sequence of messages 255.

The Dialog State 235 comprises Send and Receive Buffers 250 and 240, respectively. The Dialog State 235 controls and stores such invariant information as the Dialog identifier, the assurances specified by the application, and the partner endpoint address. The Dialog State 235 also controls session information such as next outgoing transmission sequence number and acknowledgement state. Further, configuration data such as the Dialog TTL, timeouts, the location of the store, etc. is maintained in Dialog Session State 235.

Once a message is captured, Protocol 270 can then process and transmit the captured message, e.g., message 275, accordingly through Port 285. The programming model and runtime infrastructure for Dialog 200 provide a flexible and efficient endpoint resolution model.

The model, at a minimum, insures that the two endpoints are sufficiently resolved to provide for reliable message exchange. In particular, Protocol 270 can insure prior to delivering the initial message in a dialog for processing, that both endpoints hold a reference sufficient to guarantee endpoint uniqueness and the correct correlation of messages through Dialog 200 and its corresponding session. This is required, for example, to ensure that a message is reliably delivered to a single session partner, so as to ensure at-most-once delivery. This endpoint resolution can be based on multiple factors, including an identifier that identifies the partner application (e.g., a Universal Resource Identifier (URI)) used by the creator of Dialog 200, local configuration, routing data in message headers, intermediary configurations, and the target application configuration.

It is important to note that the Application implementation 205 does not need to be concerned with the details of Dialog endpoint resolution. The infrastructure for Dialog 200 performs a resolution process to coordinate with the initiating endpoint to ensure that it is the uniquely selected peer endpoint for the session. This is done as needed and is transparent to the Application implementation 205.

The runtime end-point resolution for Dialog can also be provided to ensure achieving message delivery goals, while providing the flexibility to achieve correct execution in a wide range of network configurations. This feature supports the flexible deployment of applications in various configurations to address scalability, availability, security (such as firewalls) and performance requirements. Service deployment configurations include, for example, application farms (e.g., scale-out replicas) and application partitions (e.g., to partition processing by customer number or geographic region). Application farms and partitions can be used separately or together. For example, an application may be deployed to use data-dependent routing to an application partition, which is in turn comprised of a farm of application servers.

Protocol 270 also determines what type of end-to-end assurance and local features have been specified by Application 205, independent of the method for performing endpoint resolution described above. If the Application 205 specifies ALO assurance, the Protocol 270 keeps a copy of the message 275 in Dialog's Send Buffer 250 until the Protocol 270 receives a positive acknowledgment from the receiver (not shown) that the message 275 was properly received. When Protocol 270 receives a positive acknowledgment from the receiver, it records this fact in Session State 235, and deletes the message from the Send Buffer 250. If the Protocol 270 does not receive a positive acknowledgment within a specified retry timeout, the protocol retransmits a copy of the same message 275 with the same message sequence number. Dialog 200 may repeat this process a number of times, and may employ retry timer back-off strategies in order to avoid further congestion on the network. If an acknowledgment is not received within the time period specified by the message TTL, then an error is raised to inform the sending Application 205 that the assurance could not be met.

When a dialog message 280 is received, Protocol 270 copies the message in Receive Buffer state 240. The Protocol 270 also records the next expected message sequence number. When a message 280 is received, if the Dialog 200 assurances include AMO, the message sequence number of the arriving message 280 is compared with the set of message sequence numbers that have previously arrived, which as previously mentioned are stored in Receive Buffer state 240. If the set already contains a matching sequence number, the message 280 is considered a duplicate and is discarded; otherwise, the message 280 is placed in the local Receive Buffer 240 for future reference.

If the assurances include ALO, then the Protocol 270 sends an un-sequenced complete selective positive acknowledgment, on receipt of the message 280, to the partner endpoint for the dialog. This acknowledgement must include the sequence numbers of all messages that have been received thus far in the session. A shorthand notation that includes a set of sequence ranges can be used to conserve message space.

If the specified assurances do not include IO, then the message 280 is immediately made available for "delivery" to the receiving Application 205 through the Receive Channel 220. In particular, a notification is sent to the Application 205 that a message is available for receipt. The Application 205 can then call Receive( ) 215 whereupon the next message available for delivery is passed to the Application 205 and "delivery" is said to occur.

If the IO assurance is specified, the sequence number of the arriving message 280 is compared with the next expected sequence number. If the sequence number is less than the next expected sequence number, the arriving message 280 is discarded. If they match, the arriving message 280 is immediately made available for delivery to the receiving Application 205, and the next expected sequence number is set to the number of the next missing message. If the sequence number is greater than the next expected sequence number, then the behavior depends on whether or not the ALO assurance is also specified. If the ALO assurance is not specified, then the message 280 is immediately made available for delivery to the receiving application 205, and the next expected sequence number is set to one more than the sequence number of the arriving message 280. If the ALO assurance is specified, the message 280 is not made available for delivery to the receiving Application 205, but remains in the Receive Buffer 240. Accordingly, if they do not match, a presumption that at least one other message of a lower sequence number has not yet been received. When all such missing-lower numbered messages have arrived, then the continuous range of messages is made available for delivery to the receiving application in the appropriate sequence, and the next expected sequence number is set to the number of the next missing message.

As mentioned above, when messages are available for delivery to the receiving Application 205, a notification is issued to the receiving Application 205. The receiving application can then call Receive( ) method 215 on the Dialog Channel 220 to accept delivery of the next message available. Receive( ) can be called multiple times to receive each available message in turn. In order to insure ordering, the event notifications are delivered serially. Accordingly, when a message is available for delivery to Application 205, a single event notification is delivered to Application 205 by calling application code that was previously registered with a Dialog 200 event. Until that call to the application code returns, no other calls to that application code will be made even if other messages are available for delivery. Within that application code, the Application 205 would typically call Dialog Receive( ) 215 to receive the next available message.

Also as described above, when Send( ) 210 is called, the number of messages currently in the Send Buffer 250 is compared with the specified buffer quota. If it exceeds the quota, the caller Send( ) 210 is blocked on an event until either space becomes available, or until the send timeout is exceeded. When space becomes available in the Send Buffer 250, the buffer checks if there are any callers waiting to send messages. If so, caller Send( ) 210 unblocks and again can send messages.

All states for Dialog 200—including those in message buffers 250 and 240, those in Channel 220, and those in Protocol 270—can be simultaneously maintained in Dialog Store 260. The Dialog Store 260 should contain the most up-to-date information. This guarantees that the Dialog State 235 has the durability properties of the Dialog Store 260, and allows all the features to function irrespective of the Store 260 that is in use. For example, placing a message 280 in the Receive Buffer 240 may involve disk writes to Store 260. In order to provide the assurances, acknowledgments are sent only after the message has been recorded in the Store 260. This insures, for example, that either the sender or receiver always has a copy of the message. Similarly, on the sending side, the Send( ) 210 would complete only after the message has been recorded in the Store 260.

As previously mentioned, the Dialog Store 260 may be a pluggable store, allowing tremendous flexibility to meet durability, performance, autonomy, and administrative goals. For example, a store 260 can be selected from one of a plurality of stores within a single framework including the following: a memory Dialog Store implementation that keeps all state in the application memory; an express Dialog Store implementation that keeps state in the memory of a separate dedicated daemon process; or a durable database store implementation, such as Structured Query Language (SQL) server. Different dialogs within the same Application 205 may use different stores. Moreover, the present invention also provides that some Dialog Stores 260 can be configured to run on the local computer node, or another node.

Because Dialog 200 acts as an agent on behalf of the Application 205, Application 205 is insulated to changes in connectivity. This enables, for example, batch styles of processing where an application starts, sends and receives some messages, and then exits without having to wait for the other endpoint to respond or even be available. Further, message delivery can be scheduled with great flexibility subject only to meeting the various delivery assurances and local features, e.g., message or session TTL. For example, subject to delivery assurances, Dialog 200 can spread peak message loads over some period of time (load balance) or otherwise shift message delivery to a more cost-effective time, wait for a resource to become available, account for message or Dialog priority, etc., independent of the Application 205. In addition, Store 260 provides shutdown and restart capabilities for Application 205. Batch processing, scheduling, as well as application shutdown and restart capabilities increase the availability and the scalability of the system.

In addition, and as alluded to above, the Application 205 can specify that the Send( ) 210 or Receive( ) 215 operations be transacted with respect to the Dialog Buffers 250 and 240. This allows the application to, for example, receive a message, send some messages on one or more dialogs, and update an application table all within a single transaction. In this usage of transactions, it is simply a local notion and does not carry to the other endpoint.

Dialog also provides fault recovery during runtime, which can automatically recover (mask) many faults 265 without involving the application implementation. An application can rely on receiving the asserted characteristics (i.e., the asserted assurance and features) for the life of a Dialog 200. If the infrastructure for Dialog 200 or Protocol 270 determines that the asserted characteristics can no longer be met, the dialog is placed in a faulted state, and a fault event is raised, allowing for out-of-band corrective action independent from mainline application code or even the Application 205. If the fault 265 can be corrected (repaired), the dialog can be placed back into service. Unrecoverable failures, i.e., faults that cannot be repaired, can result in termination of Dialog 200 and application notification. Such a design conforms to the "fail-fast" model, which is fundamental to the development of reliable applications.

Survivable failures can include the following: corrupt, lost, duplicated or delayed messages; transport and network failures; process failures; intermediary failures and system failures. As mentioned above, because Dialog 200 provides an abstraction to the application and maintains its own buffers and store, Dialog 200 also supports applications and environments with intermittent connectivity. Dialogs can also adapt to changing environments, such as changes to network topology, renegotiated security contexts or endpoint relocation.

Dialog 200 can automatically attempt to repair these faults on its own, such as by resending a message. Alternatively, or in conjunction, Dialog 200 can send a request to a third party, e.g., a system operator or diagnostic code, requesting assistance in repairing the fault. This assistance could be, for example, simple human intervention to repair a broken connection in a network, or possibly an automated repair process. In any event, once the fault is repaired, Dialog 200 can continue sending messages. These, coupled with other availability features, allows for long-lived Dialogs. If, however, a fault cannot be resolved by Dialog 200 or through some other third party intervention, an error message should be raised to the Application 205 that initiated the dialog.

Applications can be configured to use Dialog Stores 260 that allow Dialogs to be maintained across application process failure and restart. Some Stores 260 can additionally tolerate system failure and restart.

Other transmission faults can be handled automatically by a combination of domain-specific fault handlers and basic message retransmission support as described above. Examples include faults resulting from security credential or policy expiration. If a message transmitted on a secured session faults due to credential expiration, Dialog 200 can renegotiate the security credentials and clear the dialog fault. When dialog processing resumes, the buffered messages will be retransmitted with the updated credentials by virtue of standard retry process.

Also as mentioned above, the design and corresponding infrastructure for Dialog 200 allows the runtime to dynamically adapt a Dialog 200 to a changing execution environment. This can be provided transparent to the application implementation and supports the existence of long-lived Dialogs and highly available applications.

The above described combinations of fault handlers (that can be pluggable), transmission and delivery retry and the fault and repair model allow Dialogs to adapt to many environmental changes. These changes include, but are not limited to, policy changes (e.g., message privacy), protocol changes (e.g., support for new security protocols), network topology changes (e.g., the addition or removal of routers or firewalls), changing a deployed application to handle increased load (e.g., introducing an application farm and/or partitions), and relocation of a dialog endpoint and associated state (e.g., disaster recovery). This also allows for scalable deployment options, which includes support from the very small to the very large. For example, Dialog 200 supports scale-up, scale-out, application replication or partitioning, again transparent to the application implementation.

Figure 3:
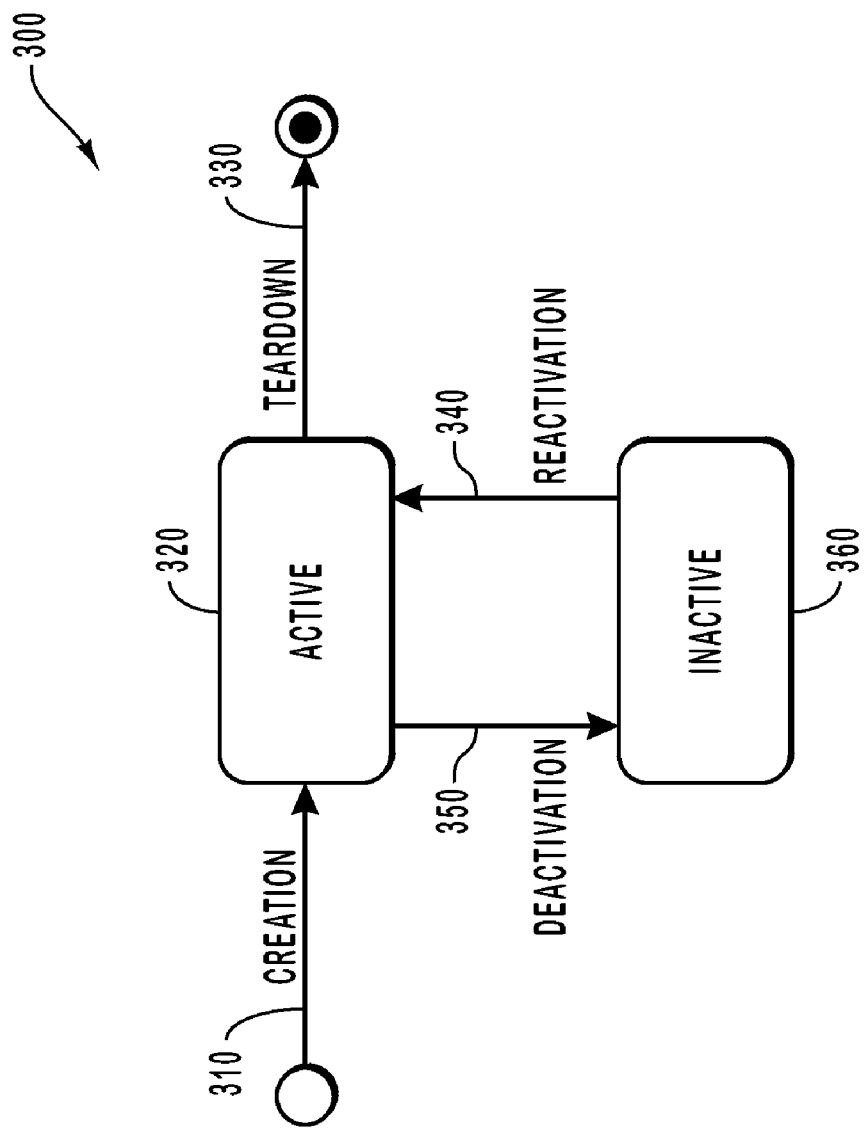
FIG. 3 illustrates a lifecycle for a link between an application and a transport in accordance with example embodiments of the present invention.

FIG. 3 illustrates the lifecycle and states of Dialog 200. Dialog 200 can be in one of two main states, Active 320 or Inactive 360. If the Dialog 200 is Active 320, Dialog Channel object 220 is in memory, otherwise the Dialog 200 is Inactive 360 and Dialog 200 exists only in the Dialog Store 260. Managing system resources occurs through the Deactivation 350 and Reactivation 340 processes, which can occur manually or automatically. For example, Deactivation 350 can occur manually if the application calls Dispose, or automatically due to an inactivity time, wherein some period of time elapses where no messages are exchanged over the dialog channel. Such a channel could be deactivated (the corresponding objects released from memory) thus freeing memory resources for other things.

Reactivation 340 can occur manually if an application requests the Channel from Dialog Manager (not shown), or Reactivation 340 may occur automatically if a new message arrives for the session. Each dialog is assigned a unique ID by the Dialog Manager during Dialog Creation 310. This ID is passed by the Application 205 to the Dialog Manager on a Reactivation 340 request, and the Dialog Manager uses the ID to locate the dialog state and reinitiate the channel. The Deactivation 350 and Reactivation 340 interfaces allow the system to limit the processing resources associated with Dialogs that are not being actively used to send outgoing messages or processing incoming messages. This allows the infrastructure to reclaim related resources except those associated with the Dialog Store 260. Further, this design allows for resource scheduling including: scheduling message transmission based on priority or resource availability; batching messages for more efficient transmission; scheduling message delivery based on priority or resource availability; and batching message delivery for more efficient processing.

The Creation 310 of a Dialog is controlled by the Dialog Manager and can be initiated by the application that calls the Creation 310 function. Alternatively, the messaging system can initiate Dialog Creation 310 after receiving a message from another endpoint indicating the need for a new dialog. In this case, the system notifies the Application 205 that a dialog is requested. The Application 205 can then call an Accept method on the Dialog Manager to accept the dialog request and cause Dialog Creation 310, or it can call a Reject method on the Dialog Manager to reject the dialog request. The Dialog Manager also controls Teardown 330, which can be initiated for a couple of reasons. One reason could be that the session completes successfully, i.e., both sides are done sending and no more messages remain. Another reason for Teardown 330 might be that the Dialog 200 is terminated, e.g., the application calls a Terminate( ) function or an indication is received from the partner endpoint for termination. When one side terminates the dialog, a message is sent to the other side to indicate this. There is no reliability for this message, it is simply an attempt to tell the other side that the dialog was terminated. Termination implies that no further messages will be exchanged over the dialog session.

Although the description of the invention defines the dialog as a duplex communication mechanism in which application messages can be sent and received by both session endpoint partners, another example embodiment includes a simplex model. In accordance with the embodiment, one session endpoint only sends application messages and does not receive application messages from its partner endpoint, and the session endpoint partner only receives application messages but does not send application messages. The same configurable assurances and configurable local endpoint features apply as in dialog. The implementation changes in that, at the sending endpoint, a receive buffer 240 is not required, and at the receiving endpoint, a send buffer 250 is not required.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 35, one or more application programs 36, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented within a computer system that includes one or more processors and memory storing instructions which, when executed by the one or more processors, implement the method for improving the availability and scalability of a messaging application by using a messaging infrastructure to abstract from the messaging application a selection of at least one message transport of a plurality of available message transports for exchanging messages, the messaging infrastructure selecting the at least one message transport based at least in part on one or more end-to-end message delivery assurances provided by the messaging application to the messaging infrastructure during a runtime of the messaging application, the method comprising:

at a computing system having a messaging application executed by one or more processors:
an act of a messaging infrastructure, which is separate and distinct from a messaging application, receiving one or more instructions from the messaging application during a runtime of the messaging application, the one or more instructions specifying one or more end-to-end message delivery assurances for the messaging infrastructure to use in selecting at least one suitable message transport from among a plurality of distinct message transports, the one or more end-to-end message delivery assurances comprising one or more of:
"at least once" message delivery;
"at most once" message delivery;
"in order sent" message delivery; or
session time-to-live;
an act of the messaging infrastructure identifying the one or more end-to-end message delivery assurances specified to the messaging infrastructure by the messaging application during runtime, and independent of any message transport selected during development time of the messaging application;
an act of the messaging infrastructure evaluating each of the plurality of distinct message transports to determine how well each distinct message transport fulfills the one or more end-to-end message delivery assurances specified by the messaging application; and
an act of the messaging infrastructure selecting one of the distinct message transports based at least in part on how well the selected distinct message transport fulfills the one or more end-to-end delivery assurances specified by the messaging application during runtime compared to others of the plurality of distinct message transports, such that selection of the distinct message transport is performed: (i) independently of the messaging application; and (ii) based primarily on how well the one or more end-to-end message delivery assurances identified by the messaging application during runtime are met by the selected distinct message transport, and independent of any message transport selected during development time of the messaging application.

2. The method of claim 1, further comprising:
an act of creating a link between the messaging application and the selected distinct message transport, the link being configured to exchange messages between the messaging application and a partner endpoint.

3. The method of claim 1, further comprising:
an act of receiving one or more instructions from the messaging application that specify one or more local reliable message features, wherein the one or more local reliable message features comprise at least one of the following: a session state storage; a message time-to-live; or transacted message buffering.

4. The method of claim 3, wherein the one or more local reliable message features includes at least session state storage, and wherein the session state storage comprises a pluggable store.

5. The method of claim 4, wherein the pluggable store comprises at least one of an in-memory storage, on-disk durable storage, in a daemon process storage, in non-volatile memory store, on optical storage, magnetic tape, network attached storage, or removable storage.

6. The method of claim 4, wherein the pluggable store comprises a store that is remote from the messaging infrastructure.

7. The method of claim 1, further comprising:
an act of receiving one or more instructions from the messaging application that specify one or more local reliable message features, wherein the one or more local reliable message features comprises at least one of the following: a maximum buffer quota; a minimum buffer quota; a send timeout; or a configurable poison message.

8. The method of claim 7, wherein the maximum buffer quota defines a maximum number of messages that will be buffered, and wherein when combined with a maximum message size defines a maximum number of bytes that will be buffered.

9. The method of claim 7, wherein the minimum buffer quota defines a minimum number of messages that will be buffered, and wherein when combined with a maximum message size defines a minimum number of bytes that will be buffered.

10. The method of claim 7, wherein the send timeout is configured to unblock a send operation after the send timeout expires, wherein higher priority messages are given transmission and delivery precedence over lower priority messages.

11. The method of claim 7, wherein the configurable poison message defines a number of times a message delivery is aborted or fails, after which the message is deemed to be poisoned.

12. The method of claim 1, wherein the one or more specified end-to-end message delivery assurances includes "at least once" message delivery, and wherein the message transport includes a protocol that periodically sends a copy of a previously sent message to a partner endpoint after a retry interval until an acknowledge message is received.

13. The method of claim 1, wherein the one or more specified end-to-end message delivery assurance includes session time-to-live, wherein when an acknowledge message is not received within a specified session time-to-live, no further retries are done and an error indication is given to the messaging application.

14. The method of claim 1, wherein the combination of one or more end-to-end message delivery assurances includes a session time-to-live delivery assurance.

15. The method of claim 1, further comprising:
an act of the messaging infrastructure receiving one or more additional instructions from the messaging application specifying a different combination of one or more end-to-end message delivery assurances, the different combination of one or more end-to-end message delivery assurances comprising a different combination of one or more of:
"at least once" message delivery;
"at most once" message delivery;
"in order sent" message delivery; or
session time-to-live;
an act of the messaging infrastructure evaluating each of the plurality of distinct message transports to determine how well each distinct message transport fulfills the different combination of one or more end-to-end message delivery assurances; and
an act of the messaging infrastructure selecting a different distinct message transport based at least in part on how well the different distinct message transport fulfills the different combination of one or more end-to-end delivery assurances.

16. One or more computer storage devices having stored thereon computer executable instructions that, when executed by one or more processors of a computing system, cause the computing system to implement a method for improving the availability and scalability of a messaging application by using a messaging infrastructure to abstract from the messaging application a selection of at least one message transport of a plurality of available message transports for exchanging messages, the messaging infrastructure selecting the at least one message transport based at least in part on one or more end-to-end message delivery assurances provided by the messaging application to the messaging infrastructure during a runtime of the messaging application, the method comprising:
at a computing system having a messaging application executed by one or more processors:
an act of a messaging infrastructure, which is separate and distinct from a messaging application, receiving one or more instructions from the messaging application during a runtime of the messaging application, the one or more instructions requesting one or more end-to-end message delivery assurances, and which are used by the messaging infrastructure to select a distinct message transport from among a plurality of available message transports that best fulfills the requested one or more end-to-end message delivery assurances, the requested one or more end-to-end message delivery assurances comprising one or more of:
"at least once" message delivery;
"at most once" message delivery;
"in order sent" message delivery; or
session time-to-live;
an act of the messaging infrastructure identifying the one or more end-to-end message delivery assurances specifically requested by the messaging application during runtime, independent of any message transport selected during development time of the messaging application;
an act of the messaging infrastructure evaluating the plurality of available message transports to determine a distinct message transport, selected from the plurality of available message transports, that best fulfills the one or more end-to-end message delivery assurances requested by the messaging application; and
an act of the messaging infrastructure selecting the distinct message transport in favor of one or more other available message transports, based at least in part on how well the distinct message transport fulfills the one or more end-to-end delivery assurances, requested by the messaging application during runtime, compared to the one or more other available message transports, such that selection of the distinct message transport is performed: (i) independently of the messaging application; and (ii) based primarily on how well the distinct message transport fulfills the one or more end-to-end message delivery assurances requested by the messaging application during runtime, independent of any message transport selected during development time of the messaging application.

17. The computer storage devices of claim 16, wherein the received one or more instructions further include one or more local reliable message features, including at least transacted message buffering that is available regardless of a durability of session state storage.

18. The computer storage devices of claim 17, wherein the one or more local reliable message features include a message time-to-live, wherein when an acknowledge message is not received within a specified message time-to-live, no further retries are done and an error indication is given to the messaging application.

19. The computer storage devices of claim 16, wherein the method further includes:
 an act of creating a link between the messaging application and the distinct message transport, the link being configured to exchange messages between the messaging application and a partner endpoint.

20. The computer storage devices of claim 19, wherein the created link comprises a channel, a session state buffer, a protocol and a pluggable store.

21. The computer storage devices of claim 16, wherein selecting one of the available message transports includes selecting between at least the following transports: TCP/IP, UDP, HTTP, RPC, and SMTP.

22. A system for improving the availability and scalability of a messaging application by using a messaging infrastructure to abstract from the messaging application a selection of at least one message transport of a plurality of available message transports for exchanging messages, the messaging infrastructure selecting the at least one message transport based at least in part on one or more end-to-end message delivery assurances provided by the messaging application to the messaging infrastructure during a runtime of the messaging application, the system comprising:
 one or more processors;
 one or more computer storage devices having stored thereon computer-executable instructions that are executable by the one or more processors, the computer-executable instructions, when executed by the one or more processors, defining:
  a messaging application; and
  a messaging infrastructure that is separate from the messaging application, the messaging infrastructure being configured to:
   receive one or more instructions from the messaging application during a runtime of the messaging application, the one or more instructions specifying one or more end-to-end message delivery assurances for the messaging infrastructure to use in selecting a suitable message transport from among a plurality of available message transports that best fulfills the one or more end-to-end message delivery assurances, the one or more end-to-end message delivery assurances comprising one or more of:
    "at least once" message delivery;
    "at most once" message delivery;
    "in order sent" message delivery; or
    session time-to-live;
   identify the one or more end-to-end message delivery assurances specified to the messaging infrastructure by the messaging application during runtime, and independent of any message transport selected during development time of the messaging application;
   evaluate each of the plurality of distinct message transports and determine how well each available message transport fulfills the one or more end-to-end message delivery assurances specified by the messaging application compared to others of the plurality of available message transports; and
   select the suitable message transport based at least in part on how well the selected suitable message transport fulfills the one or more end-to-end delivery assurances specified by the messaging application during runtime compared to others of the plurality of available message transports, such that selection of the suitable message transport is performed: (i) independently of the messaging application; and (ii) based primarily on how well the suitable message transport meets the one or more end-to-end message delivery assurances identified by the messaging application during runtime, and independent of any message transport selected during development time of the messaging application.

* * * * *